J. OAKLEY.
BROACH.
APPLICATION FILED JAN. 29, 1914.

1,121,126. Patented Dec. 15, 1914.

WITNESSES:
A. C. Fairbanks
A. D. Cutter

INVENTOR.
John Oakley,
BY
Webster & Co.,
ATTORNEYS.

UNITED STATES PATENT OFFICE.

JOHN OAKLEY, OF SPRINGFIELD, MASSACHUSETTS.

BROACH.

1,121,126. Specification of Letters Patent. Patented Dec. 15, 1914

Application filed January 29, 1914. Serial No. 815,179.

*To all whom it may concern:*

Be it known that I, JOHN OAKLEY, a subject of the King of Great Britain, residing at Springfield, in the county of Hampden and State of Massachusetts, have invented a new and useful Broach, of which the following is a specification.

My invention relates to improvements in tools known as drifts or broaches, which are employed to cut grooves or keyways in the bores of gears, pulleys, or any article of a more or less similar nature, and consists of a body part which is round in cross-section and has a longitudinal chip passage therein which opens through one side thereof, and a row of teeth or cutters on said body part, the latter having also therein, between or in front of said cutters, clearance holes or openings for chips, said openings extending from the outside of said body part to said passage, and being usually arranged at an incline, from their outer ends to their inner ends, which is away from the direction of the tool in operation, all as hereinafter set forth. Usually in this broach each cutter in the row is set a trifle higher than the preceding one in the row, in the direction of movement of the broach in operation.

The objects of my invention are, first, to produce a tool, of the class described above, that is self-clearing, hence will do work of a superior character, because the chips as they are cut immediately pass away from the cutting field and so do not interfere with the broaching operation or damage in any way the sides of the slots or holes which are produced by such operation; second, to provide such a tool with lateral openings that not only serve to take care of the chips the instant they are made, but also permit the proper rake to be given to the cutters, such rake being varied to meet the conditions incident to different materials upon which the tool is used, and, third, to produce a shorter and more durable broach than has heretofore generally been required for the same class of work, and a broach that is, withal, highly practicable and efficient.

Other objects will appear in the course of the following description.

I attain the objects and secure the advantages of my invention by the means illustrated in the accompanying drawings, in which—

Figure 1:
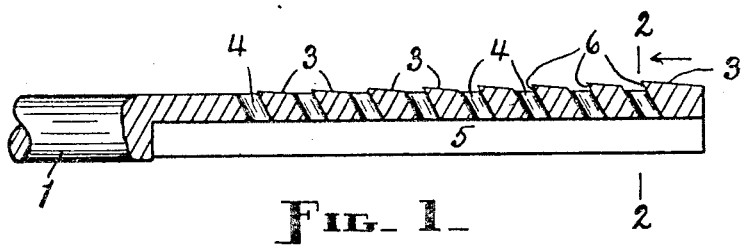
Figure 2:
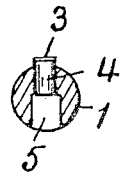

Figure 1 is a longitudinal sectional view of a broach that embodies a practical form o my invention and, Fig. 2, a cross-sectio: through such broach, taken on lines 2—ℓ looking in the direction of the associate arrow, in Fig. 1.

Like numerals designate like part throughout the several views.

Since a broach of this type may be prc vided with a threaded shank to screw int a threaded chuck, or with a part to be er gaged by a jaw chuck, or may be drive from the rear end, the front or leading en portion of my broach is omitted, it bein understood that such leading terminal po1 tion may be made of any length and shap desired. No part of my invention is ir volved in the aforesaid leading termin: portion.

My broach comprises a body 1, which : round in cross-section, and a series or ro of teeth or cutters 3 that are usually forme integral with such body, said body havin therein a lateral clearance opening or pa: sage 4 in advance of each of said cutter and a longitudinal passage 5, with whic said passages 4 communicate at their inn( ends. The passage 5 is the main clearan( passage, and usually opens through the re; end of the body 1.

In order to produce the quickest as we as the best results, the cutting edge, whic is the highest part or the part most remo from the axis of the body 1, of each cutter is a very little higher or slightly more r mote from such axis than is the correspon( ing edge of the next cutter in front, tl foremost cutter having the lowest cuttir edge and the rearmost cutter having tl highest cutting edge. More or less depa ture from this arrangement may, howeve be made, as must be apparent to one skill( in the art. The lateral passages 4 are front of their respective cutters 3. The ch or cutting made by any cutter 3 is usual as wide as the cutter, and in some cases m; spread so as to be even wider, wherefo each passage 4 should at least be as wide the cutter behind it, in order to accomm date such chip or cutting. Each passage is pitched or inclined inwardly or rea wardly. The inward and rearward pitch each passage 4 serves two purposes, first, channel that is best adapted to guide t cuttings into the passage 5 is thus provide and, second, provision is made whereby t desired rake can without difficulty be giv to the cutter behind such passage 4, the rake in question being indicated at 6. This matter of obtaining the proper rake is very important, because much of the success of the operation of a tool of this kind depends thereon, consequently the location of clearance passages in front of the cutters, whereby the rear walls of such passages coincide with or are continuations of the pitched front ends of said cutters, is of great value. The passage 5 is located in one side of the body 1, and each passage 4 extends inwardly far enough to open into or connect with said passage 5 through the interior longitudinal wall of the same.

In practice the left-hand or forward part of the body 1 is introduced into or passed through a round hole in the gear, pulley, or other article to be broached, which hole is of the same diameter as that of said body, and the tool is drawn or driven through such hole, sufficient force being applied to accomplish this operation. The cutters 3, as they are thus forced through the aforesaid hole, cut away the metal and form the groove or opening which the broach is designed to produce. The metal removed in this manner by each cutter 3 at once enters the passage 4 in front of the cutter, whereby the path of each succeeding cutter is kept clear. The cutting in question continues through the passage 4 into the passage 5 into which said passage 4 opens, and may escape from said passage 6 through the bottom of the rear end thereof. By reason of the fact that the passage 5 opens through one side of the body 1, the tool clears itself with the least possible amount of difficulty, the chips or cuttings passing directly through the passages 4 and 5 either into the original opening through the article being broached, from whence they easily and quickly escape by way of the open end of said passage 5, or out of the bottom of said passage 5, according to the position of said last-mentioned passage relative to said article.

What I claim as my invention, and desire to secure by Letters Patent, is—

As an improved article of manufacture, a broach comprising a body provided with cutters, and having a longitudinal passage and lateral passages therein, said longitudinal passage opening through one side of the same, and being common to said lateral passages, and each of the latter opening in front of one of said cutters.

JOHN OAKLEY.

Witnesses:
F. A. CUTTER,
A. C. FAIRBANKS.